(12) United States Patent
Woodford et al.

(10) Patent No.: US 10,777,852 B2
(45) Date of Patent: Sep. 15, 2020

(54) OVERCHARGE PROTECTION OF BATTERIES USING CURRENT INTERRUPT DEVICES

(71) Applicants: 24M Technologies, Inc., Cambridge, MA (US); Kyocera Corporation, Kyoto (JP)

(72) Inventors: William Henry Woodford, Cambridge, MA (US); Naoki Ota, Lexington, MA (US); Takaaki Fukushima, Okayama (JP); Jeffry Disko, North Brookfield, MA (US); Junzheng Chen, Concord, MA (US)

(73) Assignees: 24M Technologies, Inc., Cambridge, MA (US); Kyocera Corporation, Kyoto (JP)

(*) Notice: Subject to any disclaimer, the term of this patent is extended or adjusted under 35 U.S.C. 154(b) by 146 days.

(21) Appl. No.: 15/941,673

(22) Filed: Mar. 30, 2018

(65) Prior Publication Data
US 2018/0287220 A1 Oct. 4, 2018

Related U.S. Application Data

(60) Provisional application No. 62/479,640, filed on Mar. 31, 2017.

(51) Int. Cl.
*H01M 10/04* (2006.01)
*H01M 10/44* (2006.01)
(Continued)

(52) U.S. Cl.
CPC ......... *H01M 10/445* (2013.01); *H01M 2/345* (2013.01); *H01M 10/0431* (2013.01);
(Continued)

(58) Field of Classification Search
None
See application file for complete search history.

(56) References Cited

U.S. PATENT DOCUMENTS

| 3,148,322 A | 9/1964 | Booe et al. |
| 3,715,697 A | 2/1973 | Them |

(Continued)

OTHER PUBLICATIONS

International Search Report and Written Opinion for International Application No. PCT/US2018/016406, dated May 18, 2018, 11 pages.

(Continued)

*Primary Examiner* — Tracy M Dove
(74) *Attorney, Agent, or Firm* — Cooley LLP (57) ABSTRACT

A battery system includes a main electrochemical cell that includes a cathode and an anode, a cathode tab electrically coupled to the cathode, and an anode tab electrically coupled to the anode. A second electrochemical cell is electrically coupled to the cathode tab and the anode tab. An interrupt device, such as a bi-stable metal disc, is operably coupled to the second electrochemical cell and at least one of the cathode tab or the anode tab. Upon overcharging of the main electrochemical cell, the voltage between the cathode tab and the anode tab causes the second electrochemical cell to generate gases that triggers the interrupt device, which in turn disconnects at least one of the cathode tab or the anode tab, thereby protecting the main electrochemical cell from further damages.

27 Claims, 8 Drawing Sheets

(51) Int. Cl.
*H02J 7/00* (2006.01)
*H01M 2/34* (2006.01)
*H01M 10/42* (2006.01)

(52) U.S. Cl.
CPC ....... *H01M 10/4235* (2013.01); *H02J 7/0029* (2013.01); *H02J 7/00302* (2020.01)

(56) References Cited

U.S. PATENT DOCUMENTS

| | | | |
|---|---|---|---|
| 3,918,995 A | 11/1975 | Palmer et al. | |
| 5,776,627 A | 7/1998 | Mao et al. | |
| 5,879,832 A | 3/1999 | Vu et al. | |
| 6,544,679 B1 | 4/2003 | Petillo et al. | |
| 6,562,517 B1 | 5/2003 | Misra et al. | |
| 8,722,226 B2 | 5/2014 | Chiang et al. | |
| 8,722,227 B2 | 5/2014 | Chiang et al. | |
| 8,749,341 B2 | 6/2014 | Takeda et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,236,537 B2 * | 3/2019 | Hamaguchi ....... | H01M 10/4235 |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 | 12/2019 | Tan et al. | |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 2001/0038938 A1 | 11/2001 | Takahashi et al. | |
| 2004/0028995 A1 | 2/2004 | Shelekhin et al. | |
| 2010/0021821 A1 | 1/2010 | Kim et al. | |
| 2010/0047671 A1 | 2/2010 | Chiang et al. | |
| 2010/0323264 A1 | 12/2010 | Chiang et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0164499 A1 | 6/2012 | Chiang et al. | |
| 2013/0055559 A1 | 3/2013 | Slocum et al. | |
| 2013/0065122 A1 | 3/2013 | Chiang et al. | |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170524 A1 | 6/2014 | Chiang et al. | |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0171406 A1 | 6/2015 | Bazzarella et al. | |
| 2015/0180033 A1 | 6/2015 | Oyama et al. | |
| 2015/0280185 A1 | 10/2015 | Lampe-Onnerud et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0020042 A1 | 1/2016 | Stanton et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0141593 A1 | 5/2016 | Min et al. | |
| 2016/0190544 A1 | 6/2016 | Slocum et al. | |
| 2016/0218375 A1 | 7/2016 | Chiang et al. | |
| 2016/0268621 A1 | 9/2016 | Chiang et al. | |
| 2016/0308218 A1 | 10/2016 | Ota et al. | |
| 2016/0344006 A1 | 11/2016 | Ota et al. | |
| 2016/0372802 A1 | 12/2016 | Chiang et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |
| 2017/0077464 A1 | 3/2017 | Bazzarella et al. | |
| 2017/0162863 A1 | 6/2017 | Doherty et al. | |
| 2017/0214034 A1 | 7/2017 | Ota et al. | |
| 2017/0237111 A1 | 8/2017 | Holman et al. | |
| 2017/0237112 A1 | 8/2017 | Holman et al. | |
| 2017/0288281 A1 | 10/2017 | Chiang et al. | |
| 2018/0034090 A1 | 2/2018 | Chiang et al. | |
| 2018/0175428 A1 | 6/2018 | Chiang et al. | |
| 2018/0175445 A1 | 6/2018 | Tan et al. | |
| 2018/0233708 A1 | 8/2018 | Bazzarella et al. | |
| 2018/0233722 A1 | 8/2018 | Holman et al. | |
| 2019/0036101 A1 | 1/2019 | Tyler et al. | |
| 2019/0058184 A1 | 2/2019 | Bazzarella et al. | |
| 2019/0245242 A1 | 8/2019 | Tan et al. | |
| 2019/0319460 A1 | 10/2019 | Taylor et al. | |
| 2019/0326562 A1 | 10/2019 | Ota et al. | |
| 2019/0348705 A1 | 11/2019 | Chen et al. | |
| 2019/0355998 A1 | 11/2019 | Chiang et al. | |
| 2019/0363351 A1 | 11/2019 | Ota et al. | |
| 2019/0393477 A1 | 12/2019 | Lawrence et al. | |
| 2020/0014025 A1 | 1/2020 | Zagars et al. | |
| 2020/0044296 A1 | 2/2020 | Chiang et al. | |

OTHER PUBLICATIONS

International Search Report and Written Opinion for International Application No. PCT/US2018/025375, dated Jun. 27, 2018, 7 pages.

Office Action for U.S. Appl. No. 15/886,281, dated Dec. 16, 2019, 15 pages.

International Search Report and Written Opinion for International Application No. PCT/US2018/044378, dated Oct. 15, 2018, 8 pages.

* cited by examiner

OVERCHARGE PROTECTION OF BATTERIES USING CURRENT INTERRUPT DEVICES

CROSS-REFERENCE TO RELATED APPLICATIONS

This application claims priority to and the benefit of U.S. Provisional Patent Application Ser. No. 62/479,640, filed Mar. 31, 2017 and titled "Overcharge Protection of Batteries Using Current Interrupt Devices," the disclosure of which is hereby incorporated by reference in its entirety.

STATEMENT REGARDING FEDERALLY SPONSORED RESEARCH OR DEVELOPMENT

This invention was made with government support under Grant Number DE-EE0006830 awarded by the U.S. Department of Energy. The government has certain rights in this invention.

BACKGROUND

Batteries that employ Li-ion cell chemistry may produce gas when they are improperly charged, shorted or exposed to high temperatures. This gas can cause catastrophic failure, explosion, and/or may compromise the reliability and safety of such batteries. Conventional batteries including carbon and a flammable electrolyte may combust when they are improperly charged, shorted, and/or exposed to high temperature. Current interrupt devices (CIDs) in existing Li-ion cells are generally triggered by excessive gas generation within the Li-ion cells. To this end, a small headspace around the jellyroll is usually included in existing Li-ion cells. Once a cell begins to overcharge, excessive gas generated from overcharge can trigger a bi-stable metallic disk so as to disconnect one of the terminals. In some cases, gassing agents can be added to the cell to generate extra gas in an overcharge state, such as adding $Li_2CO_3$ to the positive electrode. However, these gassing agents can also induce unwanted reactions within the cell, thereby increasing the resistance and decreasing the coulombic efficiency of the cell.

An alternative method is to use a bi-stable metallic strip to cause an intentional short circuit in the presence of excessive gas generation due to overcharge. This approach also relies on gas generation from the storage electrodes and therefore can impose similar tradeoffs between safety and cell performance.

CIDs using the above approaches also suffer from accidental triggers. In general, operations of these devices are more dependent on the temperature and pressure of the cell than on the cell voltage. However, the amount of gas generated by the storage electrodes can change significantly over the lifetime of a cell. At a safe cell voltage, an older cell may generate much more gas than a newer cell does. Therefore, CIDs based on internal cell pressure can accidentally trigger even though the cell is operating safely.

SUMMARY

Apparatus, systems, and methods described herein relate to protection of batteries from over charging. In some embodiments, a battery system includes a main electrochemical cell that includes a cathode and an anode, a cathode tab electrically coupled to the cathode, and an anode tab electrically coupled to the anode. The system also includes a second electrochemical cell electrically coupled to the cathode tab and/or the anode tab and an interrupt device operably coupled to the second electrochemical cell. The interrupt device is also operably coupled to at least one of the cathode tab or the anode tab. Upon overcharging of the main electrochemical cell, the voltage between the cathode tab and the anode tab causes the second electrochemical cell to generate gases that triggers the interrupt device, which in turn disconnects at least one of the cathode tab or the anode tab, thereby protecting the main electrochemical cell from further damages. In some embodiments, upon overcharging of the main electrochemical cell, the voltage between the cathode tab and the anode tab causes the second electrochemical cell to generate gases that triggers the interrupt device, which in turn create a soft short circuit by connecting between anode and cathode through the device, thereby protecting the main electrochemical cell from damage.

DETAILED DESCRIPTION

Embodiments described herein relate generally to protection of electrochemical cells from overcharging using current interrupt devices. In some embodiments, a battery system includes a main electrochemical cell that includes a cathode and an anode, a cathode tab electrically coupled to the cathode, and an anode tab electrically coupled to the anode. A second electrochemical cell (also referred to as a sacrificial cell or a secondary cell) is electrically coupled to the cathode tab and the anode tab. An interrupt device, such as a bi-stable metal disc, is operably coupled to the second electrochemical cell and at least one of the cathode tab or the anode tab. Upon overcharging of the main electrochemical cell, the voltage between the cathode tab and the anode tab causes the second electrochemical cell to generate gases that triggers the interrupt device, which in turn disconnects at least one of the cathode tab or the anode tab, thereby protecting the main electrochemical cell from further damages.

In the battery system, the interrupt device is triggered by the second electrochemical cell, instead of the main electrochemical cell. As a result, the gas generation that triggers the interrupt device can be separated from the functionality of the main electrochemical cell. Accordingly, the second electrochemical cell can be tuned to generate a large volume of gas very rapidly so as to improve the protection while not sacrificing the lifetime and efficiency of the main electrochemical cell.

In some embodiments, a diode can be connected between the second electrochemical cell and the cathode tab (or the anode tab). The diode can adjust the threshold voltage that triggers the interrupt device, thereby decreasing the probability that the interrupt device accidentally triggers.

In some embodiments, the second electrochemical cell and the main electrochemical cell can include the same electrochemical reaction. In some embodiments, the second electrochemical cell can include materials specifically selected for gas generation, while the main electrochemical cell is optimized for other characteristics. In some embodiments, the main electrochemical cell is optimized for energy density. In some embodiments, the main electrochemical cell is optimized for specific energy. In some embodiments, the main electrochemical cell is optimized for power density. In some embodiments, the main electrochemical cell is optimized for specific power. In general, this enables the safety of the electrochemical cell to be decoupled from its performance attributes.

In some embodiments, the electrochemical reaction within the second electrochemical cell can be irreversible, in which case the interrupt device can permanently disconnect the main electrochemical cell from external circuit. In some embodiments, the second electrochemical cell can operate without a separator.

In some embodiments, the second electrochemical cell can be disposed within a casing that also encloses the main electrochemical cell. In some embodiments, the second electrochemical cell can be disposed outside the enclosure of the main electrochemical cell. In some embodiments, the second electrochemical cell and the interrupt device can be replaceable.

In some embodiments, the second electrochemical cell and the interrupt device can be added to the main cell after cell formation and/or during module or system assembly processes and/or after transporting the cells. Adding the device at a later stage of assembly can be advantageous, because this can ensure that the interrupt device is not accidentally triggered during the assembly process. In addition, after formation, if the second cell is not working correctly, the second cell can be replaced by a new one without discarding the main electrochemical cell. Similarly, if the main electrochemical cell is not working properly after formation, the second electrochemical cell and the interrupt device can still be used in another battery system.

As used herein, the term "semi-solid" refers to a material that is a mixture of liquid and solid phases, for example, such as a particle suspension, colloidal suspension, emulsion, gel, slurry or micelle.

As used herein, the terms "condensed ion-storing liquid" or "condensed liquid" refers to a liquid that is not merely a solvent, as in the case of an aqueous flow cell catholyte or anolyte, but rather, that is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

As used in this specification, the terms "about" and "approximately" generally include plus or minus 10% of the value stated. For example, about 5 would include 4.5 to 5.5, approximately 10 would include 9 to 11, and about 100 would include 90 to 110.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

As used herein, the terms "electrochemical cell," "battery," and "capacitor" all relate to a device that undergoes an electrochemical reaction due to reduction/oxidation chemistry, and are used interchangeably. Both the primary battery and the secondary battery (i.e., gas generating battery) can each conceivably be considered an electrochemical cell, a battery, or a capacitor. Other terms of art which are considered interchangeable with these terms are "cell," "supercapacitor," "electric double-layer capacitor," "primary cell," "secondary cell," "fuel cell," and "flow cell."

Figure 1A:
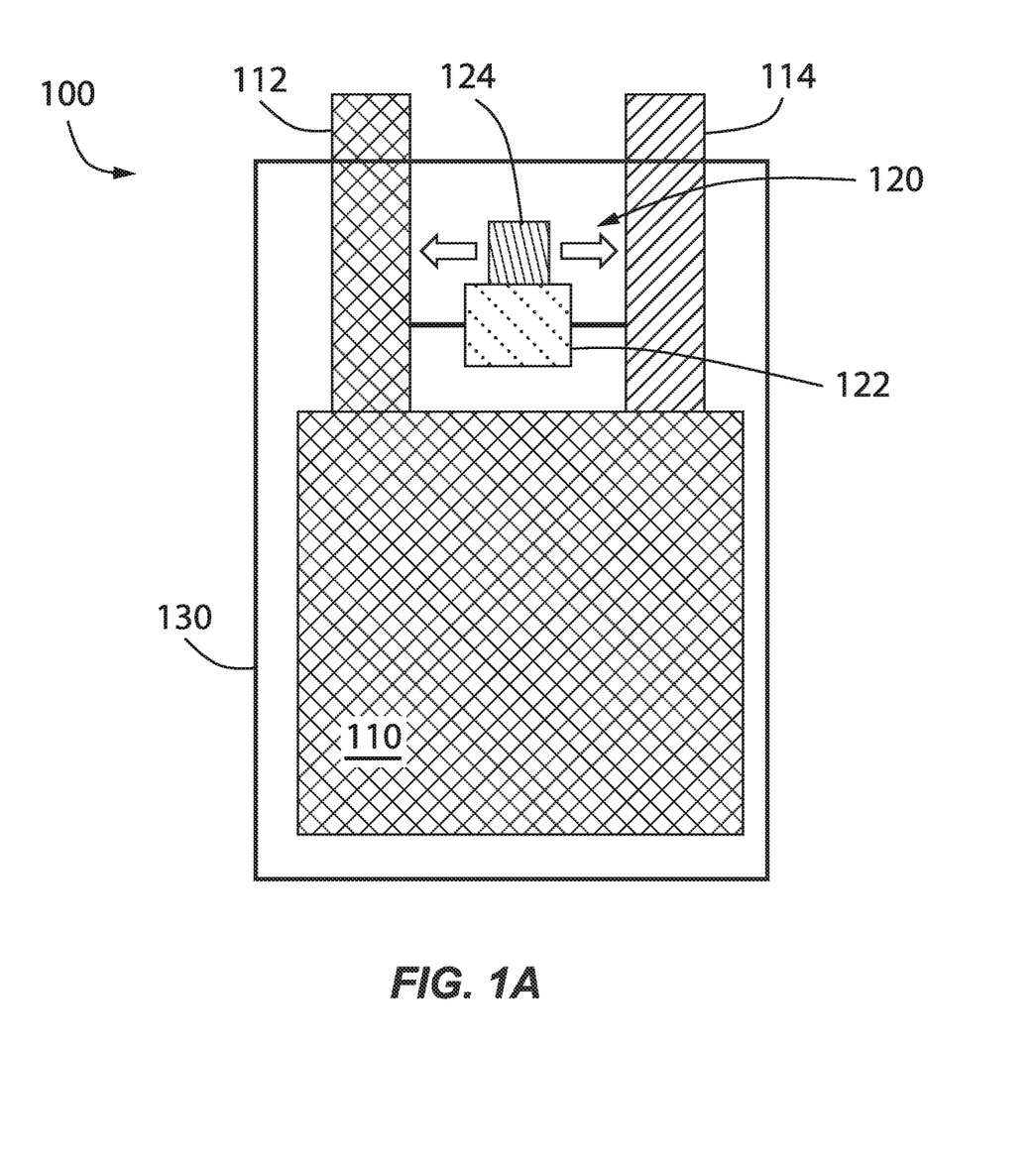
FIG. 1A shows a schematic of a battery system with a current interrupt device, according to an embodiment.

FIG. 1A shows a schematic of a battery system 100 using a current interrupt device 120 for overcharging protection, according to embodiments. The battery system 100 includes a main electrochemical cell 110 and a current interrupt device 120 to protect the main electrochemical cell 110. The main electrochemical cell 110 receives and delivers power via a cathode tab 112 electrically coupled to the cathode (not shown in FIG. 1A) and an anode tab 114 electrically coupled to the anode (not shown in FIG. 1A). The current interrupt device 120 includes a second electrochemical cell 122 and an interrupt device 124. The second electrochemical cell 122 is electrically coupled to the cathode tab 112 and the anode tab 114. More specifically, the cathode of the second electrochemical cell 122 is electrically coupled to the cathode tab 112 and the anode of the second electrochemical cell 122 is electrically coupled to the anode tab 114. In some embodiments, the second electrochemical cell 122 is coupled to the enclosure 130.

The interrupt device 124 is operably coupled to at least one of the cathode tab 112 or the anode tab 114. For illustrative purposes only, the interrupt device 124 is operably coupled to the anode tab 114 in this description. In practice, however, the interrupt device 124 can be coupled to the cathode tab 112 or both the cathode tab 112 and the anode tab 114. The main electrochemical cell 110 and the current interrupt device 120 are substantially contained in an enclosure 130 (e.g., when the enclosure 130 includes a metal case or a metal can).

The second electrochemical cell 122 is configured to generate gas in response to the voltage between the cathode tab 112 and the anode tab 114 greater than a threshold voltage (also referred to as the trigger voltage). The trigger voltage can be tuned by the design of the second electrochemical cell 122. For example, gas may be generated due to the electrochemical oxidation or reduction of a liquid solvent. The generated gas, in turn, triggers the interrupt device 124 to disconnect the anode tab 115 from external circuit. In this manner, the current interrupt device 120 can protect the main electrochemical cell 110 from overcharging.

As different liquids usually have different oxidation onset voltages, this trigger voltage can be tuned by the selection of solvents. Solid materials in the second electrochemical cell 122 may also react to produced gases, and the onset voltage of this reaction is tunable by the choice of solid materials. In general, the trigger voltage can be configured to be greater than the normal maximum operating voltage of the main electrochemical cell 110 by an appropriate selection of the solid and/or liquid materials comprising the second electrochemical cell 122. For example, if the main electrochemical cell operates to a maximum normal voltage of 4.2V, then the second electrochemical cell 122 may be configured to have a trigger voltage greater than about 4.2V. The exact trigger voltage can be optimized to balance between efficacy of the device and accidental triggering. In some embodiments, the trigger voltage can be greater than about 95% of the maximum normal operating voltage of the main electrochemical cell 110, greater than about 96%, greater than about 97%, greater than about 98%, greater than about 99%, greater than about 100%, greater than about 105%, greater than about 110%, greater than about 115%, greater than about 120%, or greater than about 125%, inclusive of all values and ranges therebetween. In some embodiments, the trigger voltage can be less than about 125% of the maximum normal operating voltage of the main electrochemical cell 110, less than about 120%, less than about 115%, less than about 110%, less than about 105%, less than about 100%, less than about 99%, less than about 98%, less than about 97%, less than about 96%, or less than about 95%, inclusive of all values and ranges therebetween.

In some embodiments, the device can trigger as quickly as possible after an overcharge condition is reached. In this case, a lower trigger voltage may be beneficial because the device may be triggered more quickly after the main electrochemical cell 110 reaches the voltage threshold, current surge threshold, temperature threshold, and/or pressure threshold. In some embodiments, it is desirable to reduce accidental triggering. In this case, the device can have a higher trigger voltage.

In some embodiments, the second electrochemical cell 122 can have a trigger voltage less than twice the normal maximum operating voltage of the main electrochemical cell 110. In certain embodiments, the second electrochemical cell 122 can have a trigger voltage less than 1.5 times the normal maximum operating voltage of the main electrochemical cell 110. In certain embodiments, the second electrochemical cell 122 can have a trigger voltage less than 1.2 times the normal maximum operating voltage of the main electrochemical cell 110.

In some embodiments, the second electrochemical cell 122 can be physically smaller than the main electrochemical cell 110 to ensure that the energy density of the full battery system 100 is maximized. In some embodiments, the second electrochemical cell 122 can occupy less than about 50% of the volume of the main electrochemical cell 110. In certain other embodiments, the second electrochemical cell can occupy less than about 25% of the volume of the main electrochemical cell 110. In some embodiments, the second electrochemical cell 122 can occupy less than about 10% of the volume of the main electrochemical cell 110. In some embodiments, the second electrochemical cell 122 can take the form of a cylinder with a diameter of about 10 mm to about 30 mm (e.g., about 10 mm, about 15 mm, about 20 mm, about 25 mm, or about 30 mm, including any values and sub ranges in between). In some embodiments, the electrochemical cell 122 can have a height of about 1 mm to about 10 mm (e.g., about 1 mm, about 2 mm, about 3 mm, about 4 mm, about 5 mm, about 6 mm, about 7 mm, about 8 mm, about 9 mm, or about 10 mm, including any values and sub ranges in between). In some embodiments, the second electrochemical cell 122 can take a different form and have a volume of about 1 mL to about 100 mL (e.g., about 1 mL, about 2 mL, about 5 mL, about 10 mL, about 20 mL, about 50 mL, or about 100 mL).

Figure 1B:
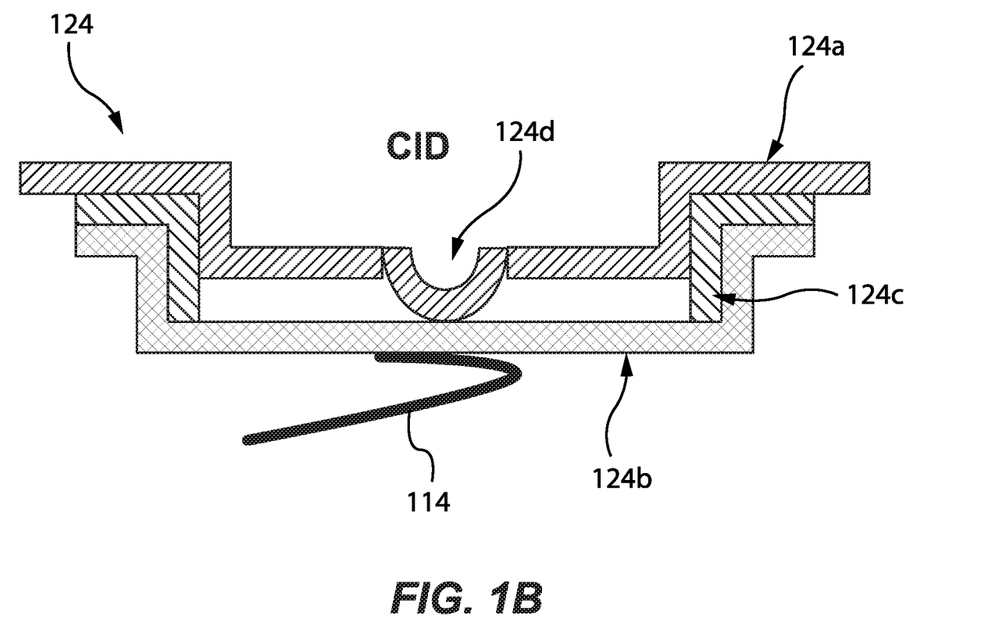
FIG. 1B shows a schematic of an interrupt device that can be used in the battery system shown in FIG. 1A, according to an embodiment.

FIG. 1B shows a schematic of an example interrupt device 124, which includes a top disc 124a, a bottom disc 124b, and an insulator 124c disposed between the top disc 124a and the bottom disc 124b. The bottom disc 124b is electrically coupled to the anode tab 114. Under normal operation conditions, the top disc 124a and the bottom disc 124b are in electric contact via a bulb portion 124d in the top disc 124a, and the top disc 124a can be connected to external circuit for charging. Upon overcharging, when a particular voltage threshold or a voltage threshold range is reached, during high current surges, and/or when the temperature within the electrochemical cell exceeds a temperature threshold, gases generated within the cell can push the top disc 124a away from the bottom disc 124b, thereby electrically disconnecting the anode tab 114 from external circuit and protecting the electrochemical cell.

Various embodiments of the battery system 100 and options of components (e.g., the main electrochemical cell 110, the current interrupt device 120, and the enclosure 130) are described below with reference to FIGS. 2-5.

The Main Electrochemical Cell

Figure 2:
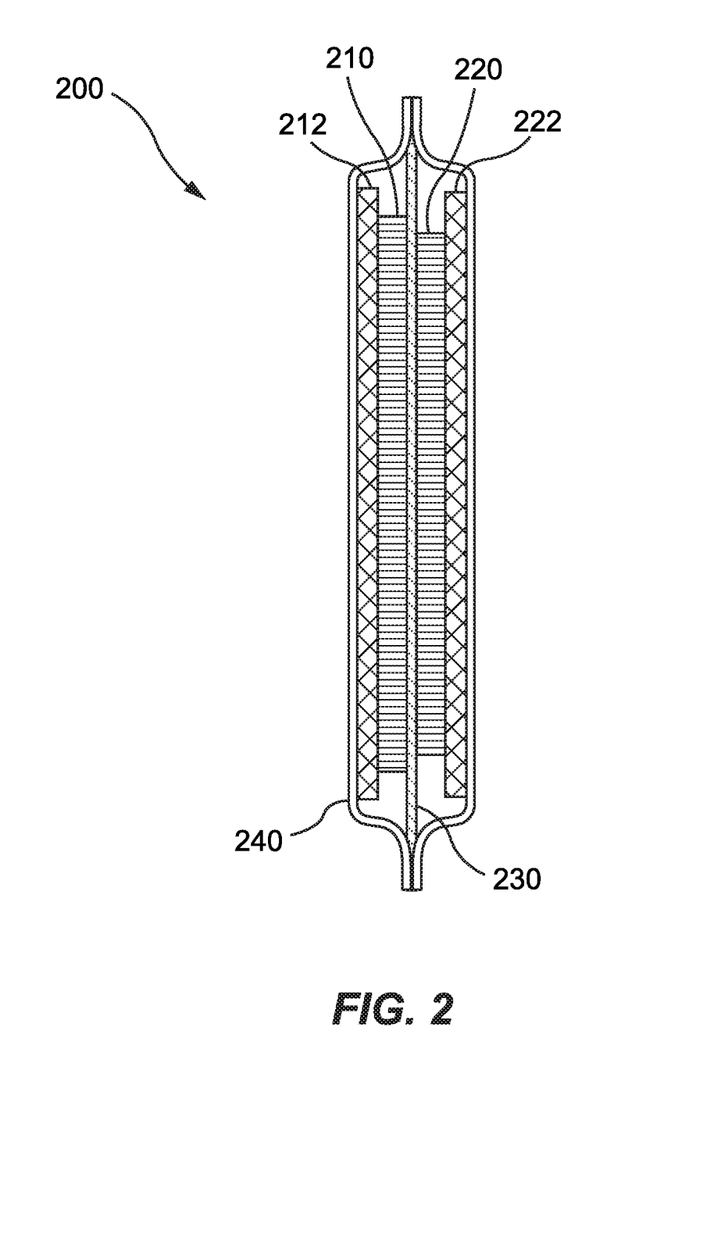
FIG. 2 shows a schematic of an electrochemical cell that can be used as the main electrochemical cell in the battery system shown in FIG. 1A, according to an embodiment.

FIG. 2 shows a side view of an electrochemical cell 200 that can be used as the main electrochemical cell 110 shown in FIG. 1A, according to embodiments. The electrochemical cell 200 includes a cathode 210 (also referred to as a cathode material) disposed on a cathode current collector 212, an anode 220 (also referred to as an anode material) disposed on an anode current collector 222, and a separator 230 disposed in between. The assembly of the cathode 210, the cathode current collector 212, the anode 220, the anode current collector 222, and the separator 230 is contained substantially in a pouch 240. Any cathode tab (not shown in FIG. 2) can be electrically coupled to the cathode current collector 212 and extends beyond the pouch 240 for connection with external circuit. Similarly, any anode tab (not shown in FIG. 2) can be electrically coupled to the anode current collector 222 and extends beyond the pouch 240 for connection with external circuit.

In some embodiments, the cathode material 210 can include, for example, Nickel Cobalt Aluminum (NCA), Core Shell Gradient (CSG), Spinel Lithium Manganese Oxide (LMO), High Voltage Spinel (LNMO), Lithium Iron Phosphate (LFP), Lithium Cobalt Oxide (LCO), Nickel Cobalt Manganese (NCM), other lithium-rich materials, and vanadium-based metal hydrides, among others.

The anode material 220 can be selected from a variety of materials. In some embodiments, the anode material 220 comprises a carbon-based material, including, but not limited to, graphite, hard carbon, carbon nanotubes, carbon nanofibers, porous carbon, and graphene. In some embodiments, the anode material 220 comprises a titanium-based oxide including, but are not limited to, spinel $Li_4Ti_5O_{12}$ (LTO) and titanium dioxide ($TiO_2$, Titania). In some embodiments, the anode material 220 comprises alloy or de-alloy material including, but not limited to, silicon, silicon monoxide (SiO), germanium, tin, and tin oxide ($SnO_2$). In some embodiments, the anode material 220 comprises a transition metal compound (e.g., oxides, phosphides, sulphides and nitrides). The general formula of a transition metal compound can be written as $M_xN_y$, where M can be selected from iron (Fe), cobalt (Co), copper (Cu), manganese (Mn), and nickel (Ni), and N can be selected from oxygen (O), phosphorous (P), sulfur (S), and nitrogen (N).

In some embodiments, the anode material 220 comprises an intermetallic compound. An intermetallic compound can be based on a formulation MM', wherein M is one metal element and M' is a different metal element. An intermetallic compound can also include more than two metal elements. The M atoms of an intermetallic compound can be, for example, Cu, Li, and Mn, and the M' element of an intermetallic compound can be, for example, Sb. Exemplary intermetallic compounds include $Cu_2Sb$, $Li_2CuSb$, and $Li_3Sb$, among others. In one example, the intermetallic compound in the anode material can have fully disordered structures in which the M or M' atoms are arranged in a random manner. In another example, the intermetallic compound in the anode material has partially disordered structures in which the M or M' atoms in the crystal lattice are arranged in a non-random manner.

In some embodiments, the anode material 220 can be porous so as to increase the surface area and enhance the rate of lithium intercalation in the resulting electrodes. In one example, the anode material 220 includes porous $Mn_2O_3$, which can be prepared by, for example, thermal decomposition of $MnCO_3$ microspheres. In another example, the anode material 220 includes porous carbon fibers prepared by, for example, electrospinning a blend solution of polyacrylonitrile and poly(l-lactide), followed by carbonization. In some embodiments, the porosity of the anode material 220 can be achieved or increased by using a porous current collector. For example, the anode material 220 can include $Cu_2Sb$, which is deposited conformally on a porous foam structure, to have certain degree of porosity.

In some embodiments, at least one of the anode material 220 or the cathode material 210 can include a semi-solid or a condensed ion-storing liquid reactant. By "semi-solid" it is meant that the material is a mixture of liquid and solid phases, for example, such as a semi-solid, particle suspension, colloidal suspension, emulsion, gel, slurry or micelle. "Condensed ion-storing liquid" or "condensed liquid" means that the liquid is not merely a solvent as it is in the case of an aqueous flow cell catholyte or anolyte, but rather, that the liquid is itself redox-active. Such a liquid form may also be diluted by or mixed with another, non-redox-active liquid that is a diluent or solvent, including mixing with such a diluent to form a lower-melting liquid phase, emulsion or micelles including the ion-storing liquid. In some embodiments, semi-solid electrode compositions (also referred to herein as "semi-solid suspension" and/or "slurry") can include a suspension of electrochemically-active agents (anode particulates and/or cathode particulates) and, optionally, electronically conductive particles. The cathodic particles and conductive particles are co-suspended in an electrolyte to produce a cathode semi-solid. The anodic particles and conductive particles are co-suspended in an electrolyte to produce an anode semi-solid. The semi-solids are capable of flowing due to an applied pressure, gravitational force, or other imposed field that exerts a force on the semi-solid, and optionally, with the aid of mechanical vibration. Examples of batteries utilizing semi-solid suspensions are described in U.S. Pat. No. 9,362,583, entitled "Semi-Solid Electrodes Having High Rate Capability," the entire disclosure of which is hereby incorporated by reference.

In some embodiments, one of both of the current collectors 212 and 222 can include a conductive substrate. In one example, the conductive substrate comprises a metal material such as aluminum, copper, lithium, nickel, stainless steel, tantalum, titanium, tungsten, vanadium, or their combinations or alloys. In another example, the conductive substrate comprises a non-metal material such as carbon, carbon nanotubes, or a metal oxide or their combinations of composite (e.g., TiN, $TiB_2$, $MoSi_2$, $n-BaTiO_3$, $Ti_2O_3$, $ReO_3$, $RuO_2$, $IrO_2$, etc.)

In some embodiments, one or both of the current collectors 212 and 222 can include a base substrate having one or more surface coatings so as to improve the mechanical, thermal, chemical, or electrical properties of the current collector. In one example, the coating(s) on the current collector can be configured to reduce corrosion and alter adhesion characteristics (e.g., hydrophilic or hydrophobic coatings, respectively). In another example, the coating(s) on the current collector can comprise a material of high electrical conductivity to improve the overall charge transport of the base substrate. In yet another example, the coatings can comprise a material of high thermal conductivity to facilitate heat dissipation of the base substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the anode material. In yet another example, the coatings can include a material with good adhering or gluing properties with the anode material.

In some embodiments, one or both of the current collectors 212 and 222 can include a conductive substrate having a roughened surface so as to improve the mechanical, electrical, and thermal contact between the anode material and the current collector. The roughened surface of the current collector can increase the physical contact area between the anode material and the current collector, thereby increasing the adherence of the anode material to the current collector. The increased physical contact area can also improve the electrical and thermal contact (e.g., reduced electrical and thermal resistance) between the current collector and the anode material.

In some embodiments, one or both of the current collectors 212 and 222 can include a porous current collector such as a wire mesh. The wire mesh (also referred to herein as mesh) can include any number of filament wires that can be assembled in various configurations using suitable processes, such as a regular pattern or structure produced by weaving, braiding, knitting, etc. or a more random pattern or structure produced by randomly distributing wires and joining them by welding, adhesives, or other suitable techniques. Moreover, the wires comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires can include coatings. For example, the coatings can be configured to reduce corrosion and enhance or reduce adhesion characteristics (e.g., hydrophilic or hydrophobic coatings, respectively). Examples of porous current collectors are described in U.S. Patent Publication No. U.S. 2013/0065122 A1, entitled "Semi-Solid Electrode Cell Having A Porous Current Collector and Methods of Manufacture," the entire disclosures of which is hereby incorporated by reference.

In some embodiments, the separator 230 can be a thin, microporous membrane that electrically separates the anode 210 from the cathode 210 but allows ions to pass through the pores between the two electrolytes during discharging and charging. In some embodiments, the separator 230 includes a thermoplastic polymer, such as polyolefins, polyvinyl chlorides, nylons, fluorocarbons, and polystyrenes, among others. In some embodiments, the separator 230 includes polyolefins material that comprises, for example, polyethylene, ultra-high molecular weight polyethylene, polypropylene, polybutene, polymethylpentene, polyisoprene, copolymers thereof, and their combinations. Exemplary combinations can include, but are not limited to, mixtures containing two or more of the following polyethylene, ultra-high molecular weight polyethylene, and polypropylene, as well as, mixtures of the foregoing with copolymers such as ethylene-butene copolymer and ethylene-hexene copolymer.

In some embodiments, the separator 230 can include thermosetting plastics, such as polyimide (PI), poly amide (PA), and poly amide imide (PAI), among others. In some embodiments, the separator 230 can include a non-woven type separator. In some embodiments, the non-woven type separator can be made of ceramic fibers. In some embodiments, the non-woven type separator can be made of fibrillated fibers. In some embodiments, the non-woven type separator can be made of cellulose nanofibers.

The pouch 240 in the electrochemical cell 200 substantially contains the cathode 210, the cathode current collector 212, the anode 220, the anode current collector 222, and the separator 230. The pouch 240 can physically separate the electrochemical cell 200 from adjacent cells so as to mitigate or eliminate defect propagation, and to facilitate easy handling of the electrochemical cell 200 during battery manufacturing. The pouch 240 can also reduce the possibility of fire ignition of flammable electrolyte during possible welding processes in battery manufacturing, which at times generates sparks, when working with a semi-solid electrode.

In some embodiments, the cathode 210, the cathode current collector 212, the anode 220, the anode current collector 222, and the separator 230 are sealed in the pouch 240 (e.g., via vacuum sealing). In these embodiments, the pouch 240 can still reduce or eliminate chances of exposure to sparking (e.g., from welding processes) that could ignite the electrolyte. A final sealing step can be carried out after the welding process to seal one or more single pouch electrochemical cells into an external pouch or package, in which case the external pouch or package can function as moisture control. Examples of battery architectures utilizing single pouch electrochemical cells are described in U.S. Patent Application Publication No. 2017/0025646, entitled "Single Pouch Battery Cells and Methods of Manufacture," the entire disclosure of which is hereby incorporated by reference.

In some embodiments, the pouch 240 includes a three-layer structure, namely an intermediate layer sandwiched by an outer layer and an inner layer, wherein the inner layer is in contact with the electrodes and the electrolyte. For example, the outer layer can include a nylon-based polymer film. The inner layer can include a polypropylene (PP) polymer film, which can be corrosion-resistive to acids or other electrolyte and insoluble in electrolyte solvents. The intermediate layer can include of aluminum (Al) foil. This structure allows the pouch to have both high mechanical flexibility and strength.

In some embodiments, the outer layer of the pouch 240 includes polymer materials such as polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and their combinations.

In some embodiments, the intermediate layer of the pouch 240 includes metal layers (foils, substrates, films, etc.) comprising aluminum (Al), copper (Cu), stainless steel (SUS), and their alloys or combinations.

In some embodiments, the inner layer of the pouch 240 includes materials such as cast polypropylene (c-PP), polyethylene (PE), ethylene vinylacetate (EVA), and their combinations.

In some embodiments, the pouch 240 includes a two-layer structure, namely an outer layer and an inner layer. In some embodiments, the outer layer can include PET, PBT, or other materials as described above. In some embodiments, the inner layer can include PP, PE, or other materials described above.

In some embodiments, the pouch 240 can include a water barrier layer and/or gas barrier layer. In some embodiments, the barrier layer can include a metal layer and/or an oxide layer. In some embodiments, it can be beneficial to include the oxide layer because oxide layers tend to be insulating and can prevent short circuits within the battery system.

In some embodiments, there can be only one (or two) unit cell(s) assembly within the pouch 240, the pouch 240 can be substantially thinner than pouches commonly used for multi-stack electrochemical cells. For example, the pouch 240 can have a thickness less than 200 µm, less than 100 µm, or less than 50 µm. The thickness of the pouch 240 as used here can be defined as the thickness of the film that forms the pouch 240.

In some embodiments, the thickness of the pouch 240 can depend on at least two aspects. In one aspect, it can be desirable to achieve high energy density in the resulting electrochemical cells, in which case thinner pouches can be helpful since a larger portion of space within a electrochemical cell can be reserved for electrode materials. In another aspect, it can be desirable to maintain or improve the safety advantage of the pouch 240. In this case, a thicker pouch can be helpful to, for example, reduce fire hazard. In some embodiments, the pouch thickness can be quantified as a ratio of the volume occupied by the pouch material to the total volume of the electrochemical cell. In some embodiments, the pouch thickness can be about 5% to about 40% in terms of the ratio as defined above. In some embodiments, the pouch thickness can be about 10% to about 30% in terms of the ratio as defined above.

In some embodiments, the thickness of the electrochemical cell 200 (including the thickness of the pouch 240 and the thickness of the electrodes) can be about 300 µm to about 3 mm (e.g., about 300 µm, about 400 µm, about 500 µm, about 1 mm, about 2 mm, or about 3 mm, including any values and sub ranges in between).

In some embodiments, the pouch 240 includes a single layer of lower cost materials that are thinner. For example, these materials can be polypropylene or a combination of polyolefins that can be sealed together using heat or pressure (e.g., thermal fusion or vacuum sealing).

In some embodiments, the pouch 240 includes a single layer of fire retardant materials so as to prevent the propagation of fire hazard from one single pouch electrochemical cell to another. In some embodiments, the pouch 240 includes an air-proof material so as to prevent the propagation of gas released by one single pouch electrochemical cell to another, thereby reducing defect propagation.

The Current Interrupt Device

Figure 3A:
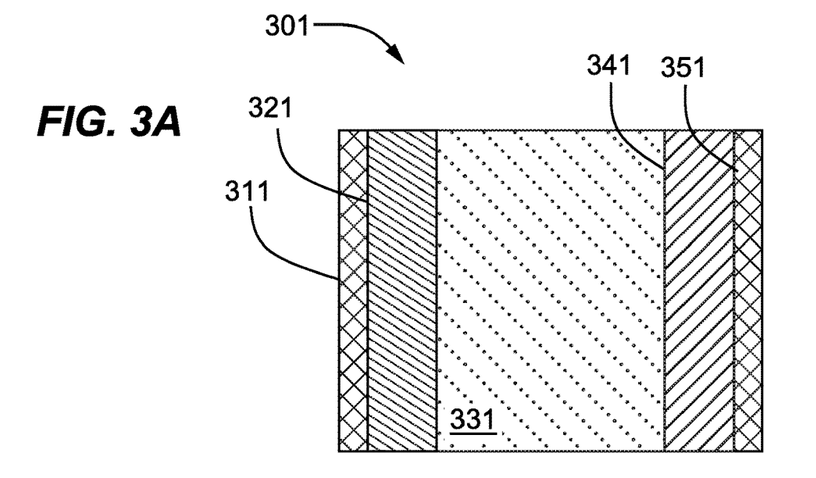
FIGS. 3A-3C show schematics of secondary electrochemical cells that can be used in the battery system shown in FIG. 1A, according to embodiments.
Figure 3B:
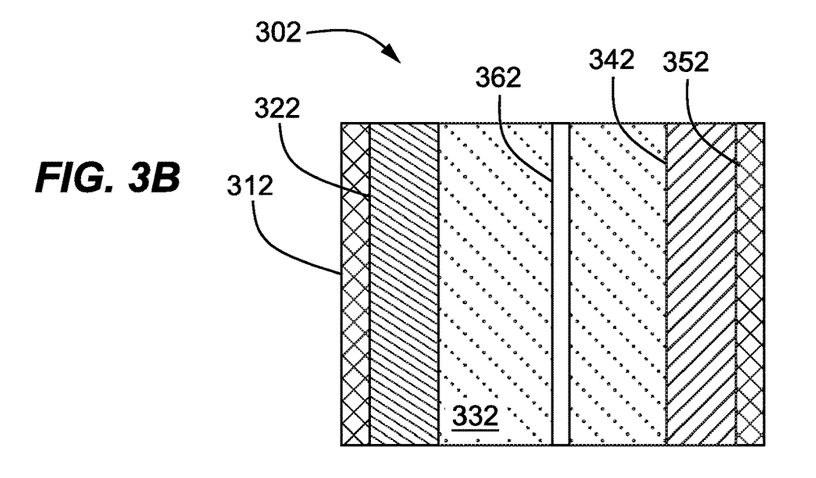

FIGS. 3A-3B show schematics of electrochemical cells that can be used as the second electrochemical cell 122 in the current interrupt device 120 shown in FIG. 1A. In the battery system 100, the second electrochemical cell 122 is employed to trigger the interrupt device 124, instead of storing energy. Therefore, a separator is not needed for the second electrochemical cell 122. However, a separator can be still included in the second electrochemical cell 122 to increase selectivity and/or to provide greater gas generation rate when the interrupt device 124 is triggered.

FIG. 3A shows a schematic of an electrochemical cell 301 without any separator. The electrochemical cell 301 includes a cathode 321 disposed on a cathode current collector 311, an anode 341 disposed on an anode current collector 351, and an electrolyte 331 disposed between the cathode current collector 311 and the anode current collector 351.

FIG. 3B shows a schematic of an electrochemical cell 302 including a separator to, for example, increase gas generation rates. The electrochemical cell 302 includes a cathode 322 disposed on a cathode current collector 312, an anode 342 disposed on an anode current collector 352, and a separator 362 disposed between the cathode 322 and the anode 342. The electrochemical cell 302 also includes electrolyte 332 disposed in the space between the cathode current collector 312 and the anode current collector 352.

Figure 3C:
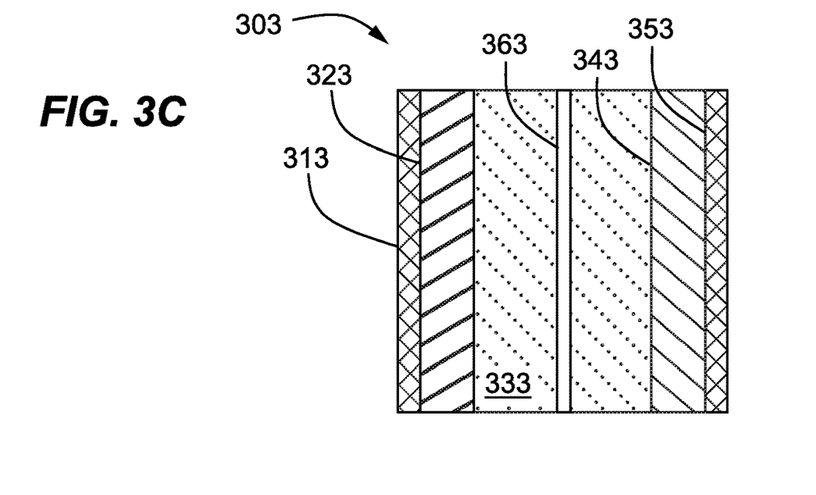

FIG. 3C shows a schematic of a capacitor 303 including a separator to, for example, increase gas generation rates. The capacitor 303 includes a cathode 323 disposed on a cathode current collector 313, an anode 343 disposed on an anode current collector 353, and a separator 363 disposed between the cathode 323 and the anode 343. The capacitor 303 also includes electrolyte 333 disposed in the space between the cathode current collector 313 and the anode current collector 353. In some embodiments, the capacitor 303 can be connected to at least one of the cathode 323 and the anode 343.

In some embodiments, components in the electrochemical cells 301 and 302 and the capacitor 303 can be substantially similar to counter components in the electrochemical cell 200. For example, the cathodes 321, 322, and 323, the cathode current collectors 311, 312, 313, the anodes 341, 342, and 343, the anode current collectors 351, 352, and 353, and the separators 362 and 363 can be substantially similar to the cathode 210, the cathode current collector 212, the anode 220, the anode current collector 222, and the separator 330, respectively.

In some embodiments, the electrochemical cells 301, 302, and 303 can be different from the electrochemical cell 200. In some embodiments, the electrochemical cells 301, 302, and 303 can use electrochemical reactions that are different from the electrochemical reaction used in the electrochemical cell 200. For example, the electrochemical cells 301, 302, and 303 can use electrochemical reactions that are otherwise undesirable due to excessive gas generation under high voltages.

In some embodiments, the electrochemical cells 301 and 302 can use reversible electrochemical reactions. In this case, the electrochemical cells 301 and 302 (and accordingly the current interrupt device including these cells) can be reused. In some embodiments, the electrochemical cells 301 and 302 can use irreversible electrochemical reactions. In this case, the current interrupt device including the electrochemical cells 301 and 302 can permanently disconnect the battery from external circuit.

In some embodiments, the electrolyte 331 and 332 can be selected based on their decomposition window. Typically, battery electrolytes (e.g., the electrolyte used in the main electrochemical cell 110) have a wide electrochemical stability window. For the sacrificial electrochemical cells 331 and 332 used in current interrupt devices, it can be desirable to choose electrolytes with a tuned decomposition potential for maximum selectivity of gas generation. In some embodiments, the electrolytes 331 and 332 can use solvents including, but not limited to, N-Methyl-2-pyrrolidone (NMP), tetrahydrofuran (THF), methyl acetate (MA), ethyl acetate (EA), acetonitrile (AN), dimethylformamide (DMF), dimethyl sulfoxide (DMSO), acetone, 1-3 dioxolane (DOL), dimethoxyethane (DME), diglyme, triglyme, tetraglyme, gamma-butyrolactone (GBL), methyl propionate (MP), and ethyl propionate (EP). In some embodiments, a lithium salt-based additive can be used to generate gas on purpose above the trigger voltage. In some embodiments, the lithium salt-based additive can be lithium bis(trifluoromethanesulfonyl)imide (LiTFSI), for example to prevent aluminum corrosion, and lithium bis(oxalate) borate (LiBOB), lithium difluoro(oxalate)borate (LiDFOB), or combinations thereof, which can generation gases such as carbon dioxide during oxidation. These solvents can react to formed gas at differing trigger voltages to tune (e.g., to increase) the gas generation capacity of the cells 301 and 302.

In some embodiments, the gas generation trigger voltage can be tuned by modifying the purity level of the solvents; in general, lower purity solvents can have lower decomposition potentials. In some embodiments, the gas generation trigger voltage can be tuned by the use of additives to the solvent. For example, additives including but not limited to, biphenyl (BP), water ($H_2O$), hydrofluoric acid (HF), and fluoroethylene carbonate (FEC) may be incorporated to tune the trigger voltage for gas generation. In some embodiments, the additive can include a salt in a solvent, the solvent having a particular purity.

In some embodiments, the current collectors (i.e., 311 and 351 in FIG. 3A, 312 and 352 in FIG. 3B) can be configured to increase gas generation. In some embodiments, the current collectors can include materials that can catalyze gas generation reactions. For example, the current collectors can include carbonaceous, metallic, or an ionic compound. In some embodiments, a non-inert electrode can be used to enhance gas generation. For example, a carbonaceous current collector can be oxidized to produce additional $CO_2$ gas.

In some embodiments, the gas generation can be determined by the solvent physical vapor pressure. In some embodiments, the gas-generation device can release gas and/or thermal energy to the CID and increase the internal pressure and/or temperature for both 302 and 200. In some embodiments, the gas generation trigger temperature can be tuned by the use of a highly volatile solvent. For example, additives including but not limited to, benzene, cyclohexane, and petroleum ether with different boiling points can be incorporated to tune the trigger temperature for gas generation.

In some embodiments, the form of the current collectors can be optimized to enhance gas generation. For example, the current collectors can include a dense foil, a porous mesh, or a metal wool (like steel wool). The increased surface area of the porous or wool-type current collector can provide additional surface area for gas generating reactions.

In some embodiments, the current collector can be coated with material that can decompose at a certain onset voltage. For example, the current collector can be coated with a solid such as $Li_2CO_3$, $LiNO_3$, and/or $Li_2O$. In some embodiments, the current collector can be coated with a polymer, such as PAN, PAA, or PVDF. These embodiments have the advantage that the liquid solvent does not directly contact the current collector until the coating material is reacted away. If this reaction is triggered at a certain voltage, then the liquid is able to contact the current collector and the gas generation rate is amplified. This provides an additional means by which the trigger voltage and gas generation rates may be independently or collectively tuned. In some embodiments, a supercapacitor that includes carbon electrodes (e.g., a polytetrafluoroethylene-based carbon electrodes without current collectors) can be used as the gas generating device.

In some embodiments, the electrodes 321, 341, 322, and 342 can include semi-solid electrodes. In some embodiments, the fraction ratio of the liquid phase material to the solid phase material in the semi-solid electrodes can be adjusted to increase gas generation.

In some embodiments, the electrodes 321, 341, 322, and 342 can include solids that evolve gas under certain electrochemical conditions. In some embodiments, the solids can include materials such as, but not limited to, $Li_2CO_3$, $Na_2CO_3$, $MgCO_3$, $CaCO_3$, $Li_3N_4$, $Li_2O$, and $Na_2O$. In some embodiments, the solids can coat the current collector and in other embodiments they may not. In some embodiments, the coating may be dense and in other embodiments it may be porous.

In some embodiments, the electrodes 321, 341, 322, and 342 can include materials that are not highly pure. For example, the electrodes 321, 341, 322, and 342 can include semi-solid electrodes of $Na_2CO_3$ dissolved in NMP for dual effects of gas generated by the decomposition of a solid and of a liquid solvent. Other combinations of solid and liquid components may be used to achieve similar dual effects of gas generation.

In some embodiments, the electrodes 321, 341, 322, and 342 can include porous electrodes. In some embodiments, the porous electrodes can include porous $Mn_2O_3$ and/or porous carbon fibers. In some embodiments, materials of the electrodes 321, 341, 322, and 342 can be disposed in porous current collectors (e.g. porous foam current collector) so as to construct porous electrodes.

Figure 4:
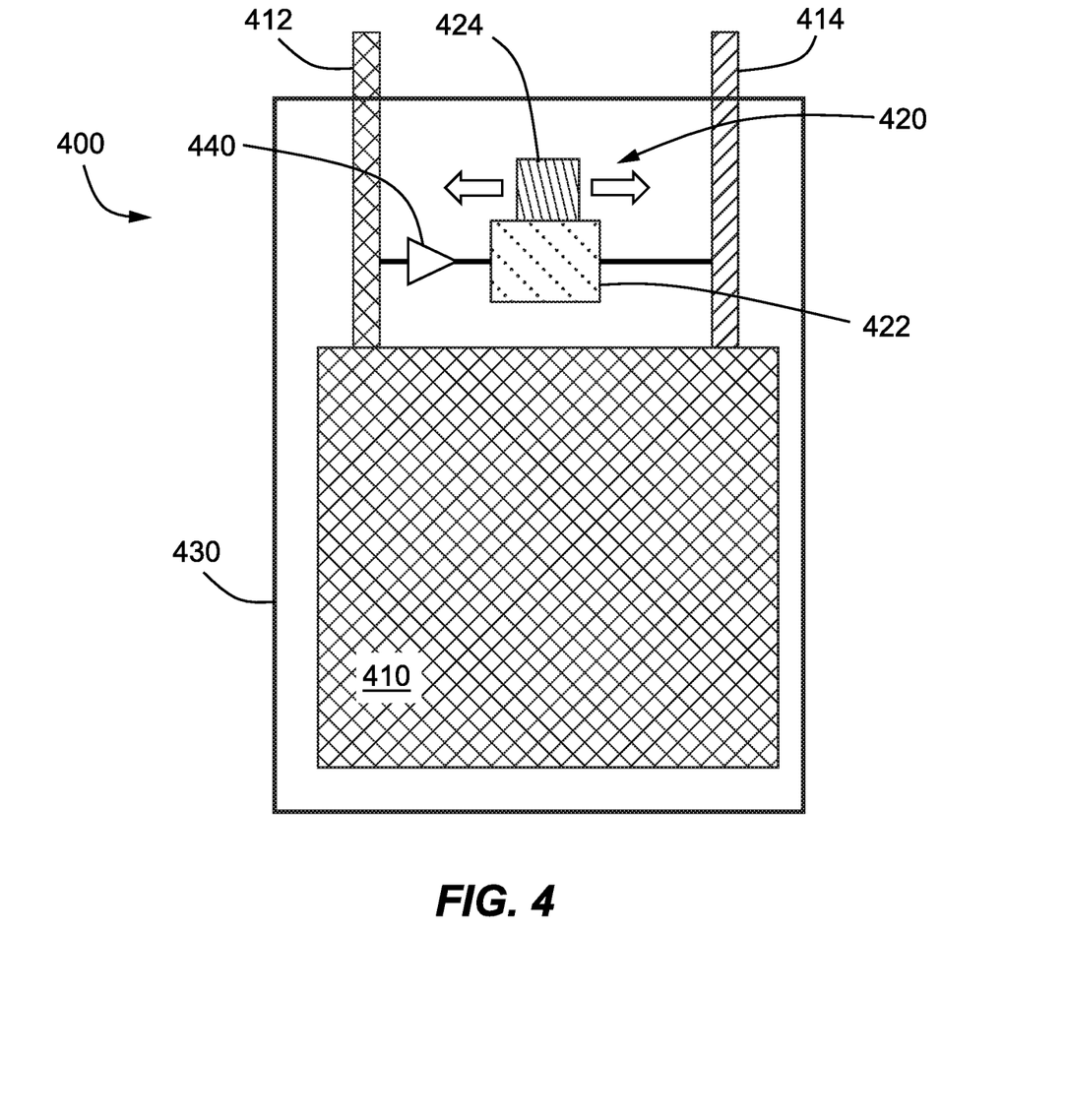
FIG. 4 shows a schematic of a battery system including a current interrupt device and a diode to regulate the triggering of the current interrupt device, according to an embodiment.

FIG. 4 shows a schematic of a battery system 400 including a diode 440 to adjust the threshold voltage that triggers the current interrupt device 420. The battery system 400 includes a main electrochemical cell 410 and a current interrupt device 420 to protect the main electrochemical cell 410. The main electrochemical cell 410 receives and delivers power via a cathode tab 412 electrically coupled to the cathode (not shown in FIG. 4) and an anode tab 414 electrically coupled to the anode (not shown in FIG. 4). The current interrupt device 420 includes a second electrochemical cell 422 and an interrupt device 414. The second electrochemical cell 422 is electrically coupled to the cathode tab 412 and the anode tab 414 such that the voltage between the cathode tab 412 and the anode tab 414 is also applied to the second electrochemical cell 422. The interrupt device 424 is operably to at least one of the cathode tab 412 or the anode tab 414. The main electrochemical cell 410 and the current interrupt device 420 are substantially contained in an enclosure 430.

A diode 440 is disposed between the cathode tab 412 and the second electrochemical cell 422. The forward bias voltage of the diode 440 can be used to adjust the threshold voltage that triggers the interrupt device 424. For example, a higher forward bias voltage of the diode 440 can lead to a higher threshold voltage that can trigger the interrupt device 424.

FIG. 4 shows that the battery system 400 includes only one diode 440 for illustrative purposes. In practice, other numbers of diodes can also be used. For example, the battery system 400 can include two diodes, with one diode disposed between the cathode tab 412 and the second electrochemical cell 422 and the other diode disposed between the anode tab 414 and the second electrochemical cell 422.

In some embodiments, the battery system 400 can also include one or more resistors disposed between the second electrochemical cell 422 and the tabs 412 and 414 (i.e. in series with the second electrochemical cell 422). The resistor(s) can split a portion of the voltage between the cathode tab 412 and the anode tab 414, thereby adjusting the voltage drop across the second electrochemical cell 422. In this manner, the resistor(s) can adjust the threshold voltage that triggers the current interrupt device 420.

In some embodiments, the battery system 400 can also include one or more operational amplifiers between the second electrochemical cell 422 and the tabs 412 and 414. The operational amplifier(s) can amplify the voltage between the cathode tab 412 and the anode tab 414, thereby increasing the sensitivity of the current interrupt device 420.

The Enclosure

In some embodiments, the enclosure 130 in FIG. 1A can include a pouch. The pouch can be substantially similar to the pouch 240 in the electrochemical cell 200 shown in FIG. 2 and described above. In some embodiments, the enclosure 130 can include a metal can, such as the metal can used in coin cell batteries. In some embodiments, the enclosure 130 can include a plastic case. In some embodiments, the metal can (used as the enclosure 130) can be electrically positive or negative. In these cases, the second battery 122 can be coupled to the metal can.

As described above, the current interrupt device 120 can be contained in the enclosure 130 or disposed outside the enclosure 130. In some embodiments, the current interrupt device 120 can be replaceable.

Figure 5:
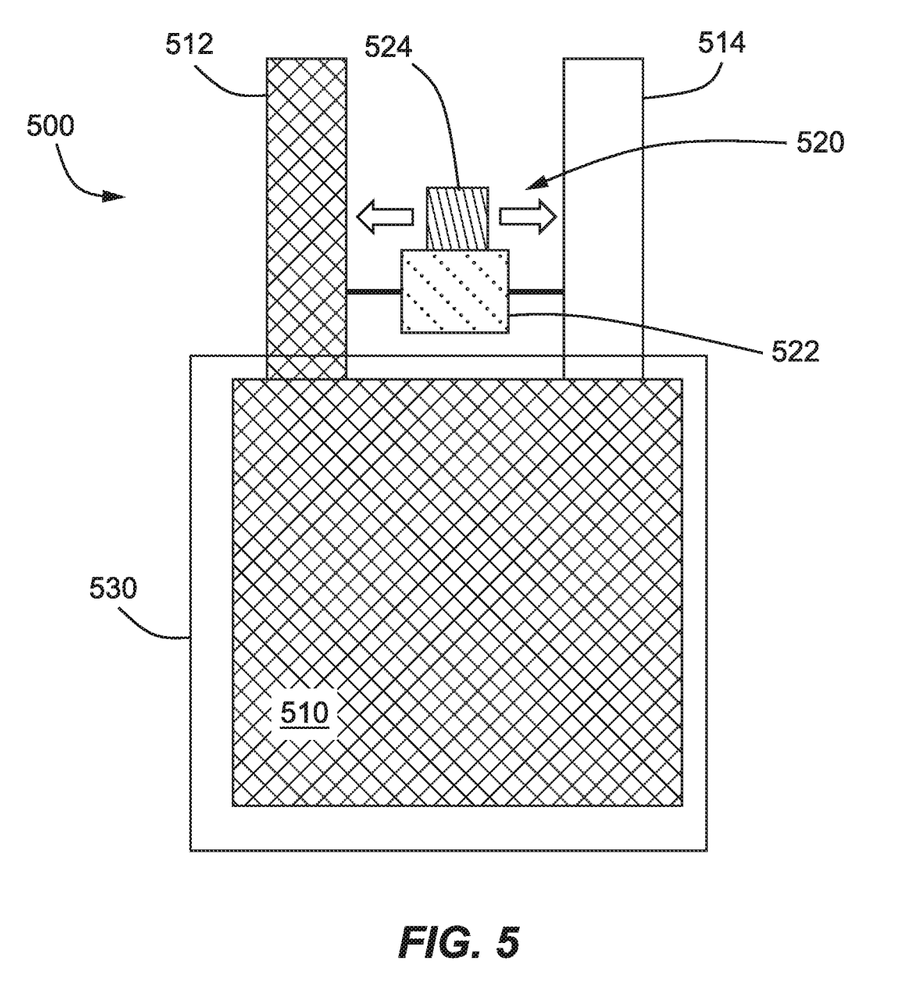
FIG. 5 shows a schematic of a battery system including a current interrupt device disposed outside the casing of the main electrochemical cell, according to an embodiment.

FIG. 5 shows a schematic of a battery system 500 including a replaceable current interrupt device disposed outside the enclosure for the main electrochemical cell. The battery system 500 includes a main electrochemical cell 510 substantially contained in an enclosure 530. A cathode tab 512 and an anode tab 514 connect the main electrochemical cell 510 with external circuits for power delivery or charging. A current interrupt device 520, including a second electrochemical cell 522 and an interrupt device 524, is disposed outside the enclosure 530 and between the cathode tab 512 and the anode tab 514. The interrupt device 524 is also operably coupled to at least one of the cathode tab 512 or the anode tab 514 so as to disconnect the tab (512 and/or 514) upon overcharging of the main electrochemical cell 510.

As shown in FIG. 5, the current interrupt device 520 is disposed outside the enclosure 530. In this case, the current interrupt device 520 can be incorporated into the battery system 500 after the formation and sealing of the main electrochemical cell 510. Adding the current interrupt device 520 at this late stage of assembly can ensure that the current interrupt device 520 is not accidentally triggered during the assembly process. In addition, after formation, if the second cell 522 is not working correctly, the second cell 522 can be replaced by a new one without discarding the main electrochemical cell 510. Similarly, if the main electrochemical cell 510 is not working properly after formation, the second electrochemical cell 522 and the interrupt device 524 can still be used in another battery system.

In some embodiments, a diode (e.g., like the diode 440 shown in FIG. 4) can be used to adjust the threshold voltage that triggers the current interrupt device 520. The diode can be coupled to the cathode tab 512 and/or the anode tab 514. In some embodiments, the enclosure 530 can include a metal enclosure and the second battery 522 can be electrically coupled to the enclosure 530 as well. In some embodiments, the metal enclosure 530 is electrically positive. In some embodiments, the metal enclosure 530 is electrically negative. In some embodiments, the metal enclosure 530 can be connected to the ground (e.g., as a ground electrode).

In some embodiments, the battery system 500 can include a second enclosure (not shown in FIG. 5) that substantially contains both the current interrupt device 520 and the enclosure 530. In this case, the second enclosure can, for example, protect the current interrupt device 520 from moisture or insulate the current interrupt device 520.

Figure 6:
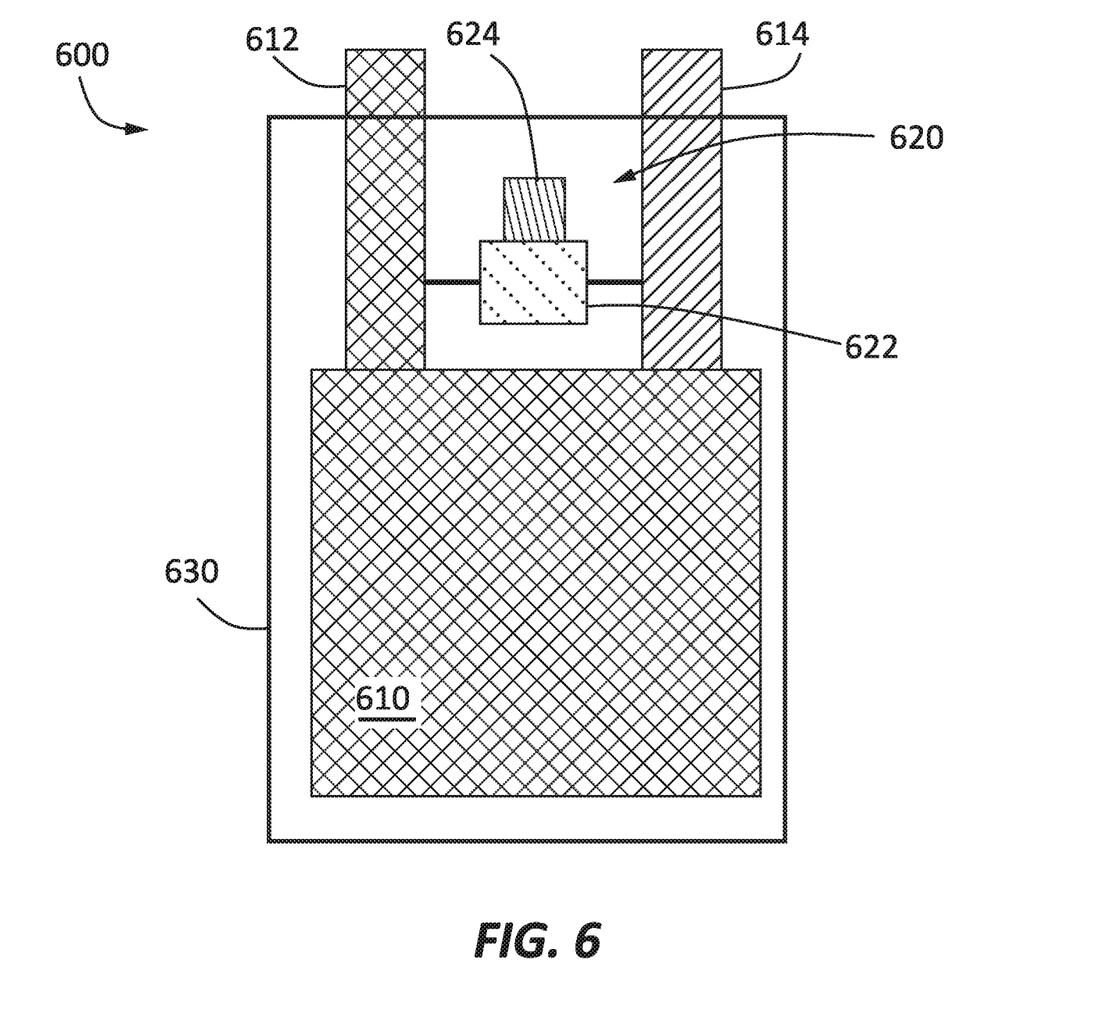
FIG. 6 shows a schematic of a battery system including a current interrupt device configured to cause a soft short circuit, according to an embodiment.

FIG. 6 shows a schematic of a battery system 600 using a current interrupt device 620 for overcharging protection, according to an embodiment. The battery system 600 includes a main electrochemical cell 610 and the current interrupt device 620 to protect the main electrochemical cell 610. The main electrochemical cell 610 receives and delivers power via a cathode tab 612 electrically coupled to the cathode (not shown in FIG. 6) and an anode tab 614 electrically coupled to the anode (not shown in FIG. 6). The current interrupt device 620 includes a second electrochemical cell 622 and an interrupt device 614. The second electrochemical cell 622 is electrically coupled to the cathode tab 612 and the anode tab 614. More specifically, the cathode of the second electrochemical cell 622 is electrically coupled to the cathode tab 612 and the anode of the second electrochemical cell 622 is electrically coupled to the anode tab 614. In some embodiments, the second electrochemical cell 622 is disposed in an enclosure 630.

The interrupt device 624 is operably coupled to at least one of the cathode tab 612 or the anode tab 614. For illustrative purposes only, as shown in FIG. 6 the interrupt device 624 is operably coupled to the anode tab 614. In practice, however, the interrupt device 624 can be coupled to the cathode tab 612 or both the cathode tab 612 and the anode tab 614. The main electrochemical cell 610 and the current interrupt device 620 are substantially encased in the enclosure 630 (e.g., when the enclosure 630 includes a pouch, a metal case, or a metal can).

The second electrochemical cell 622 is configured to generate gas in response to the voltage between the cathode tab 612 and the anode tab 614 exceeding a threshold voltage or within a threshold voltage range (also referred to as the trigger voltage). The trigger voltage can be tuned by the design of the second electrochemical cell 622. For example, gas may be generated due to the electrochemical oxidation or reduction of a liquid solvent. The generated gas, in turn, triggers the interrupt device 624 to at least temporarily disconnect the anode tab 615 from an external circuit, for example by creating a soft short circuit. In some embodiments, upon overcharging of the main electrochemical cell 610, the voltage between the cathode tab 612 and the anode tab 614 causes the second electrochemical cell 622 to generate gas that trigger the interrupt device 624. In turn, the interrupt device 624 can create the soft short circuit by connecting between anode tab 615 and the cathode tab 612 through the interrupt device 624. In this manner, the current interrupt device 620 can protect the main electrochemical cell 610 from overcharging.

Figure 7:
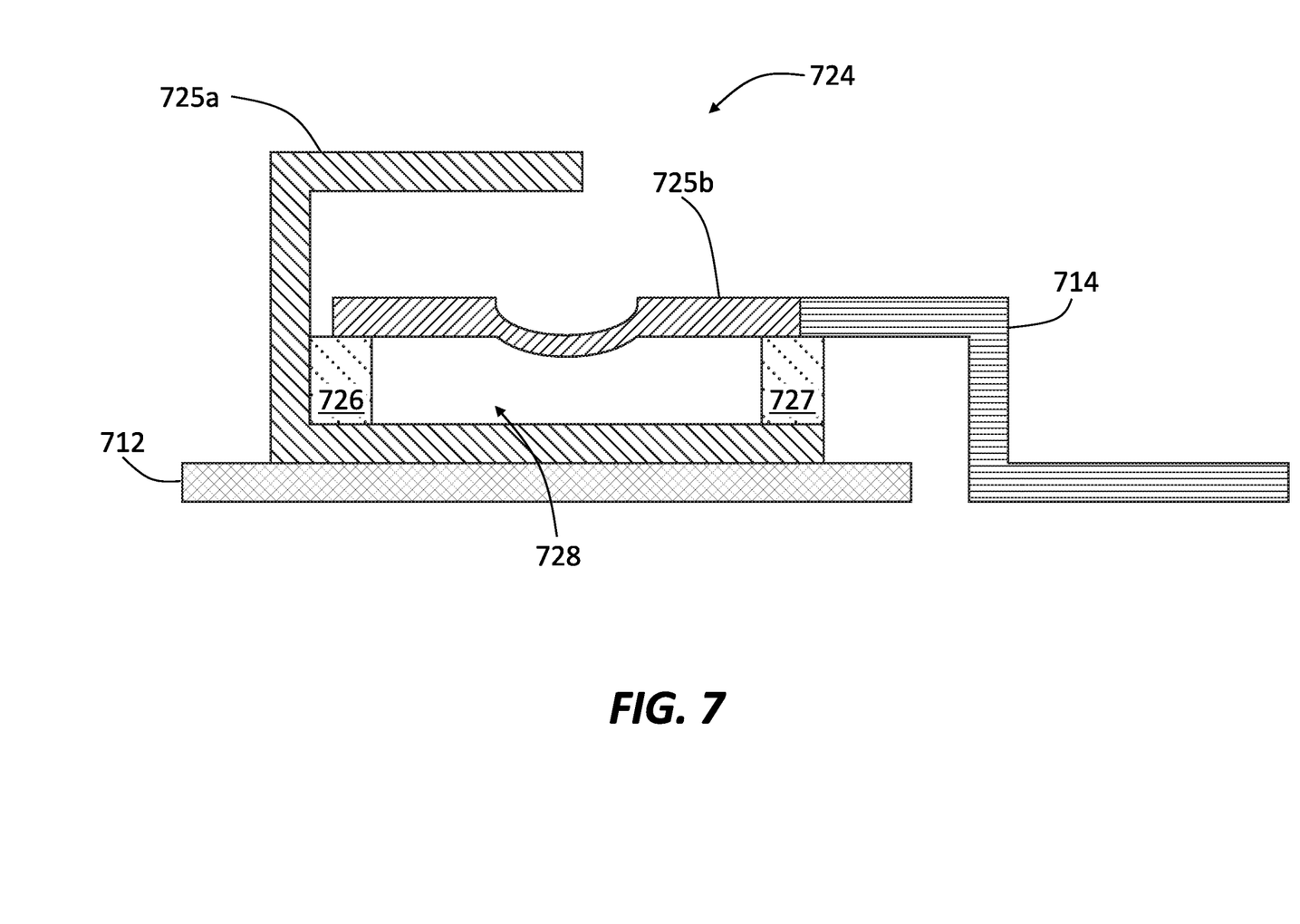
FIG. 7 shows a schematic of a current interrupt device configured to cause a soft short circuit, according to an embodiment.

FIG. 7 shows a schematic of a current interrupt device 724 for overcharge protection, according to an embodiment. In some embodiments, the current interrupt device 724 can be operably coupled to an electrochemical cell substantially similar to the main electrochemical cell 610. In some embodiments, the current interrupt device can be disposed within an enclosure (e.g., 630). In some embodiments, the electrochemical cell can include a cathode tab 712 coupled to a cathode (not shown) and an anode tab 714 coupled to an anode (not shown).

In some embodiments, the current interrupt device 724 can include a first tab connector 725a electrically coupled to the cathode tab 712 and a second tab connector 725b electrically coupled to the anode tab 714. The first tab connector 725a is electrically insulated from the second tab connector 725b during normal operation of the electrochemical cell. In some embodiments, the first tab connector 725a can be electrically insulated from the second tab connector 725b using a first insulator 726 and a second insulator 727. In some embodiments, a gas-tight cavity 728 can be defined at least in part by the first tab connector 725a, the second tab connector 725b, the first insulator 726, and the second insulator 727. In some embodiments, the current interrupt device 724 can include a liquid solvent configured to generate gas when a voltage threshold or current threshold is reached (or exceeded). In some embodiments, the liquid solvent can be substantially similar to the gas-generating liquid described above with reference to FIGS. 1A-5.

In some embodiments, a portion of the second tab connector 725b can be configured to deform when a force is applied to cause an elongation or expansion of the second tab connector 725b. In some embodiments, the force can be applied to the second tab connector 725b by gas generated from the liquid solvent in the gas-tight cavity 728. The elongation or expansion of the second tab connector 725b can be configured to electrically couple the second tab connector 725b to the first tab connector 725a. In some embodiments, the electrical coupling of the first tab connector 725a and the second tab connector 725b can be configured to cause a soft short circuit between the cathode tab 712 and the anode tab 714. Similarly, the first tab connector 725a can be configured to deform when a force is applied to the first tab connector 725a. In some embodiments, the first tab connector 725a and the second tab connector 725b can both be configured to deform when a force is applied.

In some embodiments, the soft short circuit between the cathode tab 712 and the anode tab 714 can help protect the electrochemical cell (e.g., 610) from damage due to overcharging and/or high voltage conditions. In some embodiments, the soft short circuit conditions can discontinue charging/discharging from the electrochemical cell, thereby discontinuing gas generation within the gas-tight cavity 728. In some embodiments, the deformed connector may revert substantially back to its original shape and discontinue the soft short circuit after gas generation is discontinued. In some embodiments, the discontinuation of the soft short circuit can return the electrochemical cell to normal operation.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Certain of the steps may be performed concurrently in a parallel process when possible, as well as performed sequentially as described herein. The embodiments have been particularly shown and described, but it will be understood that various changes in form and details may be made.

The invention claimed is:

1. An apparatus, comprising:
an electrochemical cell including a first anode and a first cathode;
a gas-generation device including a second anode and a second cathode, the second anode electrically coupled to the first anode, the second cathode electrically coupled to the first cathode, the gas-generation device generating gas when a voltage between the first cathode and the first anode exceeds a voltage threshold; and
current interrupt device operably coupled to the gas generation device, the current interrupt device disconnecting electrical connection between the electrochemical cell and an external circuit when a gas pressure within the gas-generation device exceeds a gas pressure threshold.

2. The apparatus of claim 1, wherein the gas-generation device is a second electrochemical cell.

3. The apparatus of claim 1, wherein the gas-generation device is a supercapacitor.

4. The apparatus of claim 1, wherein the voltage threshold is tuned by changing a composition of the gas-generation device.

5. The apparatus of claim 1, wherein the gas-generation device includes a gassing agent.

6. The apparatus of claim 5, wherein the gassing agent includes at least one of N-Methyl-2-pyrrolidone, tetrahydrofuran, methyl acetate, ethyl acetate, acetonitrile, dimethylformamide, dimethyl sulfoxide, acetone, cyclohexane, petroleum ether, 1-3 dioxolane, dimethoxyethane, diglyme, triglyme, tetraglyme, gamma-butyrolactone, methyl propionate, ethyl propionate, biphenyl, water, hydrofluoric acid, fluoroethylene carbonate, a lithium salt-based additive, lithium bis(trifluoromethanesulfonyl)imide, lithium bis(oxalate) borate, lithium bis(oxalate) borate, lithium difluoro(oxalate)borate, lithium nitrate, lithium oxide, or lithium carbonate.

7. The apparatus of claim 1, wherein the gas-generation device is replaceable.

8. The apparatus of claim 1, wherein at least one of the first anode or the first cathode includes a semi-solid electrode slurry.

9. The apparatus of claim 1, wherein the gas-generation device and at least one of the first anode or the first cathode are electrically coupled by a diode.

10. An apparatus, comprising:
a main electrochemical cell including a first cathode and a first anode;
a secondary electrochemical cell including a second anode and a second cathode, the second anode electrically coupled to the first anode, the second cathode electrically coupled to the first cathode; and
an interrupt device fluidically coupled to the secondary electrochemical cell and electrically isolated from the secondary electrochemical cell, the interrupt device forming an electric coupling between an external circuit and at least one of the first cathode or the first anode,
wherein, upon overcharging of the main electrochemical cell, a voltage between the first cathode and the first anode causes the secondary electrochemical cell to generate a gas that triggers the interrupt device to interrupt the electric coupling.

11. The apparatus of claim 10, further comprising:
an anode tab extending from the first anode; and
a cathode tab extending from the first cathode.

12. The apparatus of claim 11, wherein the secondary electrochemical cell is electrically coupled to the anode tab and the cathode tab.

13. The apparatus of claim 11, wherein the interrupt device is electrically coupled to at least one of the anode tab or the cathode tab.

14. The apparatus of claim 13, wherein the interrupt device disconnects at least one of the cathode tab or the anode tab upon overcharging of the main electrochemical cell.

15. The apparatus of claim 10, wherein at least one of the first cathode or the first anode includes a semi-solid electrode composition.

16. The apparatus of claim 10, wherein the secondary electrochemical cell includes a gassing agent.

17. The apparatus of claim 16, wherein the gassing agent includes at least one of N-Methyl-2-pyrrolidone, tetrahydrofuran, methyl acetate, ethyl acetate, acetonitrile, dimethylformamide, dimethyl sulfoxide, acetone, cyclohexane, petroleum ether, 1-3 dioxolane, dimethoxyethane, diglyme, triglyme, tetraglyme, gamma-butyrolactone, methyl propionate, ethyl propionate, biphenyl, water, hydrofluoric acid, fluoroethylene carbonate, a lithium salt-based additive, lithium bis(trifluoromethanesulfonyl)imide, lithium bis(oxalate) borate, lithium bis(oxalate) borate, and lithium difluoro(oxalate)borate, lithium nitrate, lithium oxide, and/or lithium carbonate.

18. An apparatus, comprising:
a main electrochemical cell including a cathode having a cathode tab and an anode having an anode tab;
a gas-generating electrochemical cell electrically coupled to at least one of the cathode tab or the anode tab, the gas-generating electrochemical cell including a gassing agent such that gas is generated when a voltage across the cathode tab and the anode tab exceeds a voltage threshold;
a current interrupt device fluidically coupled to the gas-generating electrochemical cell and electrically isolated from the gas-generating electrochemical cell, the current interrupt device electrically disconnecting at least one of the anode or the cathode from an external circuit when a gas pressure in the gas-generating electrochemical cell exceeds a gas pressure threshold.

19. The apparatus of claim 18, wherein the voltage threshold is tuned by changing a composition of the gas-generating electrochemical cell.

20. The apparatus of claim 18, wherein the gassing agent includes at least one of N-Methyl-2-pyrrolidone, tetrahydrofuran, methyl acetate, ethyl acetate, acetonitrile, dimethylformamide, dimethyl sulfoxide, acetone, cyclohexane, petroleum ether, 1-3 dioxolane, dimethoxyethane, diglyme, triglyme, tetraglyme, gamma-butyrolactone, methyl propionate, ethyl propionate, biphenyl, water, hydrofluoric acid, fluoroethylene carbonate, a lithium salt-based additive, lithium bis(trifluoromethanesulfonyl)imide, lithium bis(oxalate) borate, lithium bis(oxalate) borate, lithium difluoro(oxalate)borate, lithium nitrate, lithium oxide, or lithium carbonate.

21. The apparatus of claim 18, wherein the gas-generating electrochemical cell is replaceable.

22. The apparatus of claim 18, wherein at least one of the anode or the cathode includes a semi-solid electrode slurry.

23. The apparatus of claim 1, further comprising:
an anode tab extending from the first anode, and the current interrupt device electrically disconnects the anode tab from the external circuit when the gas pressure within the gas-generation device exceeds the gas pressure threshold.

24. The apparatus of claim 1, further comprising:
a cathode tab extending from the first cathode, and the current interrupt device electrically disconnects the cathode tab from the external circuit when the gas pressure within the gas-generation device exceeds the gas pressure threshold.

25. The apparatus of claim 1, wherein the gas-generation device generates gas at a first voltage and the electrochemical cell generates gas at a second voltage, the first voltage lower than the second voltage.

26. The apparatus of claim 10, wherein the secondary electrochemical cell generates gas at a first voltage and the main electrochemical cell generates gas at a second voltage, the first voltage lower than the second voltage.

27. The apparatus of claim 18, wherein the gas-generating electrochemical cell generates gas at a first voltage and the main electrochemical cell generates gas at a second voltage, the first voltage lower than the second voltage.

* * * * *

UNITED STATES PATENT AND TRADEMARK OFFICE
CERTIFICATE OF CORRECTION

PATENT NO. : 10,777,852 B2
APPLICATION NO. : 15/941673
DATED : September 15, 2020
INVENTOR(S) : Woodford et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*